(12) United States Patent
Fan et al.

(10) Patent No.: US 7,591,920 B1
(45) Date of Patent: Sep. 22, 2009

(54) TECHNIQUES FOR BONDING SUBSTRATES USING DYNAMIC ALTERNATING ELECTRIC FIELD

(75) Inventors: Kal Leung Fan, Hong Kong (CN); Ming Sang Yeung, Hong Kong (CN)

(73) Assignee: Dongguan Anwell Digital Machinery Co., Ltd. (CN)

( * ) Notice: Subject to any disclaimer, the term of this patent is extended or adjusted under 35 U.S.C. 154(b) by 150 days.

(21) Appl. No.: 11/292,918

(22) Filed: Dec. 2, 2005

Related U.S. Application Data

(63) Continuation-in-part of application No. 11/170,022, filed on Jun. 28, 2005, now abandoned.

(51) Int. Cl.
*B32B 37/00* (2006.01)
(52) U.S. Cl. ............... 156/272.2; 156/274.4; 156/275.5
(58) Field of Classification Search ............... 156/64, 156/272.2, 272.6, 274.4, 275.5
See application file for complete search history.

(56) References Cited

U.S. PATENT DOCUMENTS

| | | | |
|---|---|---|---|
| 5,277,737 A * | 1/1994 | Li et al. | 156/274.8 |
| 6,402,880 B1 * | 6/2002 | Ewerlof et al. | 156/295 |
| 6,613,170 B1 * | 9/2003 | Ohno et al. | 156/64 |
| 2002/0033328 A1 * | 3/2002 | Stimson | 204/192.12 |
| 2002/0134515 A1 * | 9/2002 | Yamaguchi et al. | 156/379.6 |
| 2003/0000634 A1 * | 1/2003 | Eichlseder | 156/237 |

FOREIGN PATENT DOCUMENTS

JP 2003217185 A * 7/2003

OTHER PUBLICATIONS

Abstract for JP 2003217185 2003.*
Machine translation for JP 2003217185 2006.*

* cited by examiner

*Primary Examiner*—John L Goff
(74) *Attorney, Agent, or Firm*—Joe Zheng

(57) ABSTRACT

Techniques for bonding substrates are disclosed. According to one aspect of the techniques, an index bonding is provided to ensure that non-flatness of substrates is compensated when two substrates are bonded together so as to minimize possible dynamic imbalance of a disc. According to another aspect of the techniques, a dynamic alternating electric field bonding is provided to eliminate bubbles from a type of glue used to bond two substrates, wherein a power source is used to generate a dynamic alternating electromagnetic field in accordance with the substrates and/or the characteristics of the glue.

23 Claims, 8 Drawing Sheets

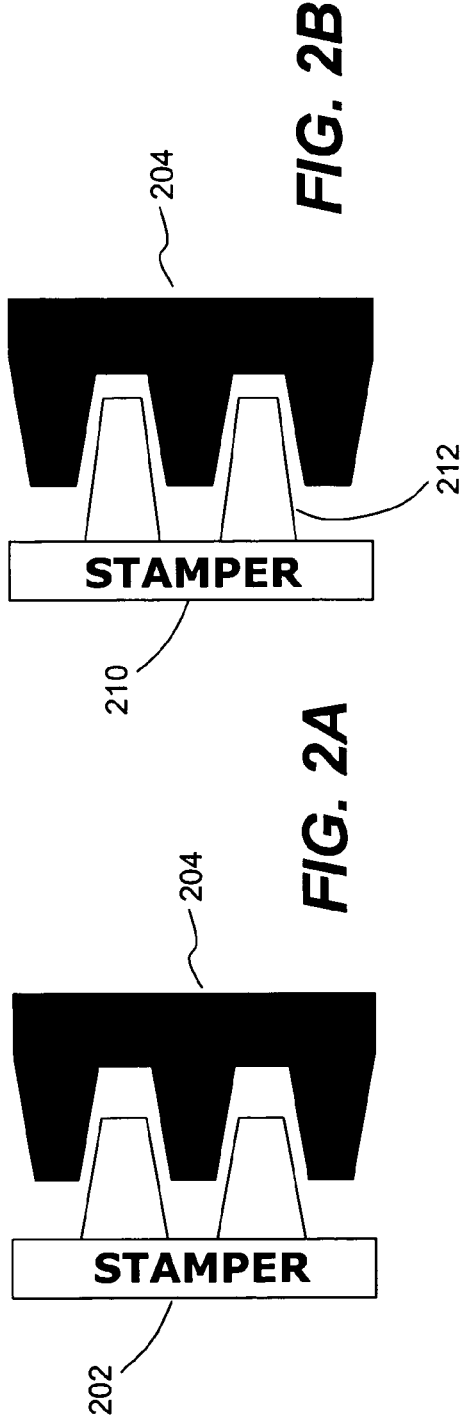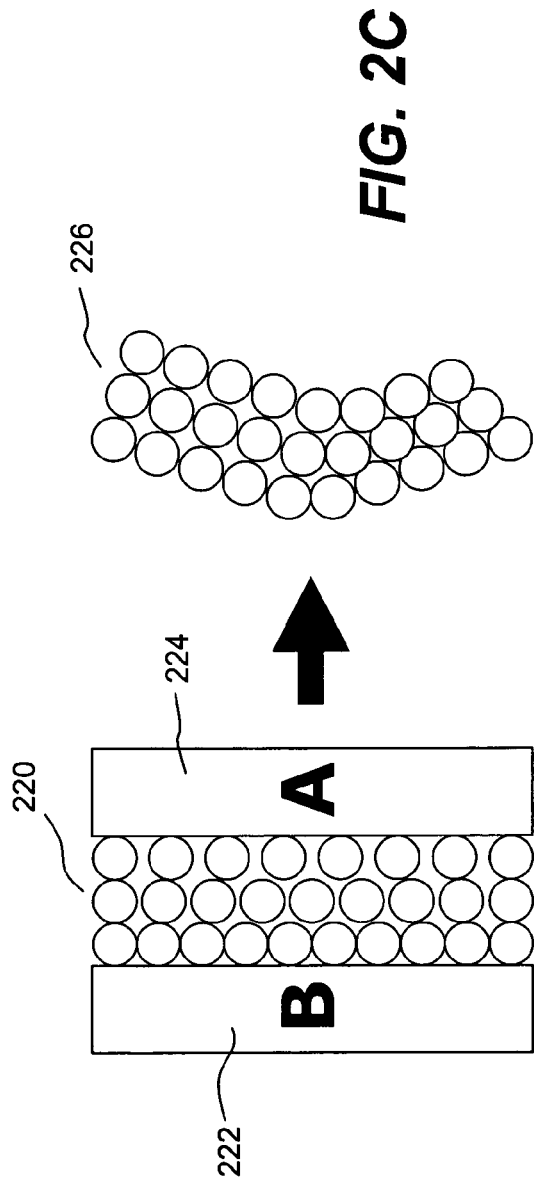
FIG. 2A
FIG. 2B
FIG. 2C

TECHNIQUES FOR BONDING SUBSTRATES USING DYNAMIC ALTERNATING ELECTRIC FIELD

CROSS-REFERENCE TO RELATED APPLICATION

This is a continuation-in-part of U.S. application Ser. No. 11/170,022, entitled "Techniques for bonding substrates" and filed Jun. 28, 2005, and by at least one of the co-inventors hereof, now abandoned.

BACKGROUND OF THE INVENTION

1. Field of the Invention

The invention is generally related to the area of optical information recording medium. More particularly, the present is related to techniques for producing disk-shaped optical medium for carrying or recording digital information, and for bonding substrates to minimize possible dynamic imbalance and eliminate bubbles in glues in resultant discs.

2. The Background of Related Art

One of the most popular optical storage medium is DVD (Digital Versatile Disc). Technically, DVD is a relatively new generation of optical disc storage technology. It is much larger in data capacity and faster in reading than CD and can hold cinema-like video, better-than-CD audio, still photos, and computer data. DVD aims to encompass home entertainment, computers, and business information with a single digital format. It has replaced laserdisc, is well on the way to replacing videotape and video game cartridges, and could eventually replace audio CD and CD-ROM. DVD has widespread support from all major electronics companies, all major computer hardware companies, and all major movie and music studios. With this unprecedented support, DVD became the most successful storage device of all time in the history of optical storage technologies.

Although blank or content DVD manufacturing is similar to CD manufacturing in that mastering, electroforming (stamper making), molding, metalizing, printing, and testing are required, there are significant differences that include bonding two circular substrates together, additional testing, and the handling of much smaller physical features and specifications. Each of steps in manufacturing DVD requires significant attention in order to increase the product yield and manufacturing speed and, at the same time, reduce the manufacturing costs.

Bonding, for example, is the most sensitive step of the DVD manufacturing process. The importance of this step can not be over emphasized. Improper bonding can create discs that are warped, unbalanced, improperly aligned, have bubbles, etc., all leading to out-of-specification discs that would not be played at the speed required for many applications such as movies and video games. At the very least, trouble in this area could lead to lower production yields and ultimately higher costs and slower delivery. There have been many efforts in bonding techniques to improve the DVD manufacturing process. However, current solutions are not satisfactory, inferior DVD resulted from the bonding step alone can be noticed that the production yield is being diluted.

Therefore there has been a great need for techniques that produce disk-shaped optical medium with minimum errors, improve production speed and reduce costs of the optical medium that can be subsequently read at substantially high speeds with greater stability and accuracy.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for producing optical medium that can be read at substantially high speeds with greater stability and accuracy. According to one aspect of the present invention, a molding station includes an optimized stamper which, nevertheless, does not have an exact inverse image of a replica. To account for an inherent distortion in a substrate after being stamped, a stamper is pre-distorted in a manner that the pit geometry in the stamped substrate becomes nearly perfect after the inherent distortion.

According to another aspect of the present invention, the injection of a molten material, the mold position and compression are respectively controlled to account for possible non-uniform density distribution of the material. According to still another aspect of the present invention, a bonding station is employed with what is referred to as index bonding technique and/or dynamic alternating electric field bonding technique. The index bonding is provided to ensure that non-flatness of substrates is compensated when two substrates are bonded together so as to minimize possible dynamic imbalance of a disc. The dynamic alternating electric field bonding is provided to eliminate bubbles from a type of glue used to bond two substrates, wherein a controllable alternating power source is used to create a dynamic alternating electric field in accordance with the substrates and/or the characteristics of the glue.

There are numerous functions, benefits and advantages in the present invention, one of them is that the present invention provides techniques for producing optical discs with minimum dynamic imbalance that can be read at high speeds with great stability and accuracy. Another one of the functions, benefits and advantages in the present invention is the specialized stamper that allows for faster stamping without inducing distortions in the stamped disks. Still another one of the functions, benefits and advantages in the present invention is the balance density molding that balances the distribution density of one or more materials used for the disks. Still another one of the functions, benefits and advantages in the present invention is the index bonding that provides effective compensation of non-flatness in the disks and minimizes dynamic imbalance. Yet another one of the functions, benefits and advantages in the present invention is the dynamic alternating electric field bonding that effectively eliminates bubbles in the glue so as to provide bubble-free bonding of disks. Other functions, benefits and advantages may be appreciated by those skilled in the art given the detailed description herein.

The present invention may be implemented in software and hardware as method, process, or system. According to one embodiment of the present invention, the present invention is a system for producing optical medium, the system comprises at least a first and a second molding station, the first molding station producing first substrates and the second molding station producing second substrates, wherein each of the molding stations includes a stamper that is not an exact inverse image of a replica, at least a first bonding and a second bonding station, each of the first and second bonding stations sequentially receiving the first and second substrates and bonding one of the first substrates and one of the second substrates with a type of glue between the first and second substrates to form a disc or part of a disc; and means for curing the glue.

According to another embodiment of the present invention, the present invention is a system for producing optical medium, the system comprises at least a first and a second molding station, the first molding station producing first substrates and the second molding station producing second substrates, each of the molding stations receiving an injection of a molten material in a mold cavity formed by two mold plates one of which includes a stamper, controlling positions of the mold plates and applying pressures onto the mold plates to mold a substrate, wherein the injection, an movement of the mold plates and the pressures are respectively controlled and programmable in accordance with a density distribution of the molten material; at least a first bonding and a second bonding station, each of the first and second bonding stations sequentially receiving the first and second substrates and bonding one of the first substrates and one of the second substrates with a type of glue between the first and second substrates to form a disc or part of a disc; and means for curing the glue.

According to still another embodiment of the present invention, the present invention is a method for bonding substrates, the method comprises dispensing a certain amount of glue on a first substrate; pushing the first disk towards a second substrate; applying a power source to the first and second substrates when the glue is in contact with the second substrate to eliminate possible bubbles in the glue, wherein the power source generates an alternating electric field that reduces the surface tension of the glue and hence releases the trapped air in the glue; and rotating the first and second substrates at a substantially high speed to spread evenly the glue therebetween by a centrifugal force while compressing the first and second substrates for bonding.

According to still another embodiment of the present invention, the present invention is a method for bonding substrates, the method comprises adjusting a first substrate by an angle with respect to a second substrate to minimize possible dynamic imbalance of a disc including the first and second substrates; dispensing a certain amount of glue on the first substrate; pushing the first disk towards the second substrate; applying a power source to the first and second substrates when the glue is in contact with the second substrate to eliminate possible bubbles in the glue, wherein the power source generates an alternating electric field that cause a release of bubbles possibly trapped in the glue; and rotating the first and second substrates at a substantially high speed to spread evenly the glue between the first and second substrates by a centrifugal force while the first and second disks are being bonding.

According to still another embodiment of the present invention, the present invention is an apparatus for bonding substrates, the apparatus comprises means for dispensing a certain amount of glue on a first substrate; a lower holder for holding the first substrate; an upper holder for holding a second substrate, wherein when the first substrate and the second substrate are pushed relatively towards each other; a power source is applied to produce an alternating electric field for the first and second substrates to eliminate possible bubbles in the glue, and wherein both of the lower and upper holders rotate the first and second substrates at a substantially high speed to spread evenly the glue between the first and second substrates by a centrifugal force while the first and second substrates are being compressed for bonding.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A shows that a stamper is an exact inverse image of a replicated substrate, which means that the stamper is made the opposite of what is expected in the replicated substrate;

FIG. 2B shows that the stamper is pre-distorted in accordance with one embodiment of the present invention;

FIG. 2C shows a cross-section view of a mold cavity formed by two plates to be pressed, wherein one of the two plates is integrated with a stamper;

DETAILED DESCRIPTION OF THE PREFERRED EMBODIMENTS

The present invention pertains to techniques for producing optical medium that can be read at substantially high speeds with greater stability and accuracy. According to one aspect of the present invention, a molding station producing disk-like substrates includes an optimized stamper that does not have an exact inverse image of a replica. To account for an inherent distortion in a substrate after being stamped, a stamper is pre-distorted so that the pit geometry in the stamped substrate becomes nearly perfect after the inherent distortion. According to another aspect of the present invention, the injection of a molten material, the mold position and compression are respectively controlled to account for possible non-uniform density distribution of the material. According to still another aspect of the present invention, a bonding station is employed with what is referred to as index bonding technique and/or alternating electric field bonding technique. The index bonding is provided to ensure that non-flatness of substrates is compensated when two substrates are bonded together so as to minimize possible dynamic imbalance of a disc. The alternating electric field bonding is provided to eliminate bubbles from a type of glue used to bond two substrates, wherein a controllable power source is used to generate an alternating electric field in accordance with the substrates and the characteristics of the glue. Other aspects of the present invention may be appreciated in the following detailed description.

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
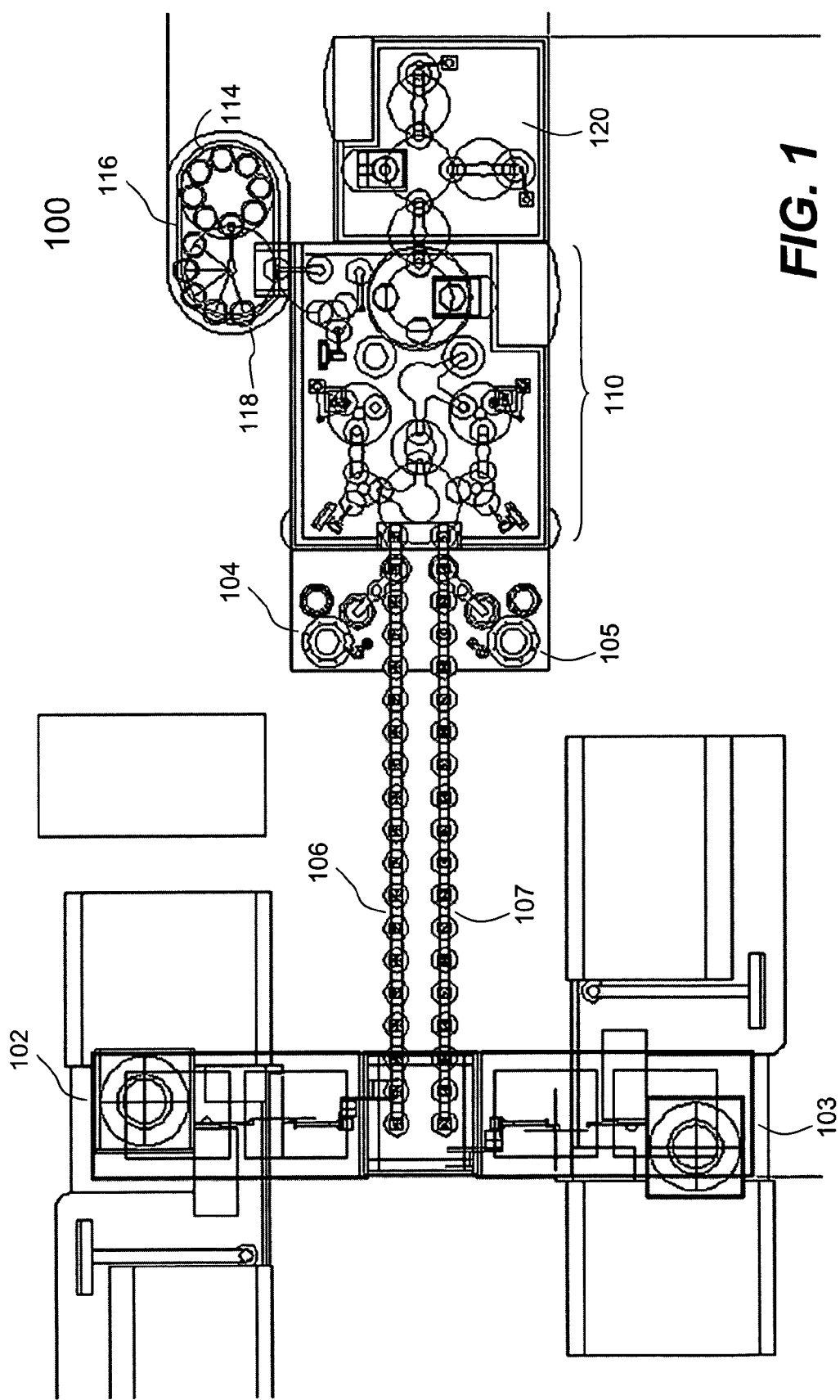
FIG. 1 shows an exemplary configuration in which the present invention may be practiced.

Referring now to the drawings, in which like numerals refer to like parts throughout the several views. FIG. 1 shows an exemplary configuration 100 in which the present invention may be practiced. The configuration 100 may represent a standalone production line or part of a system used to produce optical discs for carrying or storing digital information. As shown in FIG. 1, there are two molding machines 102 and 103, each is configured to produce disk-like substrates from a type of raw material (e.g., polycarbonate). In operation, the molding machines 102 and 103 respectively produce what is referred to as layer 0 and layer 1 substrates or simply L0 and L1 substrates. Different from a molding machine in a prior art system, each of the molding machines 102 and 103 employs what is referred to herein as a balance molding technique the detail of which is to be described below.

Before the L0 and L1 substrates reach two corresponding metalizing stations 104 and 105, each of the L0 and L1 substrates going through a cooling process including two convey belts 106 and 107. In one embodiment, as the L0 and L1 substrates are sequentially produced from the molding machines 102 and 103, they are placed respectively on the convey belts 106 and 107. The moving speeds of the convey belts 106 and 107 may be controlled or programmable in accordance with the characteristics of the material used to produce the substrates so as to ensure that L0 and L1 substrates are hardened properly before being metalized at stations 104 and 105.

The L0 and L1 substrates are then metalized. In one embodiment, the each of the L0 and L1 substrates is sputtered with one or more reflective materials (e.g., silver, aluminum, gold, or silver alloy). After the L0 and L1 substrates are sequentially metalized at stations 104 and 105, respectively, they are transported to two bonding stations 110, each controlled and operating independently. According to one aspect of the present invention, each of the bonding stations 110 is equipped with alternating electric field bonding technique and/or index bonding technique. As a result, resultant discs by bonding two or more substrates in accordance with the present invention can readily meet the stringent jitter requirements and be read with high speeds with great stability and accuracy.

It should be noted that the configuration 100 is configured to produce discs with two bonded substrates, such as DVD9 (single sided and dual layer). Those skilled in the art can appreciate that the system or configuration 100 is readily expended to produce more respective substrates at substantially the same time. For example, four respective substrates may be produced and bonded for DVD18 (double sided and dual layer). The detailed description on various aspects of the present invention herein, whenever referring two substrates or the configuration 100, is to facilitate the understanding of the present invention. There is no inherent limitation that the present invention can only be applied to optical medium production involving two substrates or any particularities of the system 100.

The bonding stations 110 also include one or more glue curing means to cure the glue in the discs. One of the examples of the glue curing means is the UV lights. To facilitate the quality control of the discs from the bonding stations 110, two disc buffers 112 and 114 are provided in a disc stocker 116. Depending on implementation, the two disc buffers 112 and 114 may be used to collect discs respectively from the two bonding stations 110 or one of the two disc buffers 112 and 114 is configured to receive good discs and the other one of the two disc buffers 112 and 114 is configured to receive fault discs when a test station 118 is provided. In the case that the two disc buffers 112 and 114 are used to collect discs respectively from the two bonding stations 110, an examination of the discs in the two disc buffers 112 and 114 may dictate which one of the bonding stations may need an attention. In any case, a test station 118 may be provided and configured to determine whether the disc being produced meet specified requirements.

In some cases in which the discs are required to have additional features, such as providing a protective layer on one or both sides of the discs or imprinting image on one side of the discs, one or more optional stations may be attached to the configuration 100. In one embodiment, a station 120 is provided to coat discs from the bonding stations 110 with a protective layer such that the discs are more resistant to possible scratches when in use.

According to one embodiment, one or more cameras (not shown) are provided along the flow of producing the discs. For example, one or more cameras may be positioned to monitor the process of the molding machines 102 and 103, one or more cameras may be positioned to monitor the transporting of the substrates to the metalizing stations 104 and 105, and one or more cameras may be positioned to monitor the bonding stations 110. Further one or more cameras may be provided to monitor other phases of the flow, such as the test station 118 or disc buffers 112 and 114. In any cases, images from the cameras may be viewed on one or more monitors. In one embodiment, the images are digitalized, encoded, compressed and transported via a network to monitors remotely located.

It is known in the art that mastering in CD manufacturing is a process of creating the pit and land structures on a substrate. This substrate is the starting point for creating a stamper holding the information to be replicated. To master DVD versus CD, changes are made in the mastering optics and laser to create a smaller exposed area. This smaller area is needed to create smaller pit geometry that is almost half the size of the CD pit geometry in nanometers. Electroforming is a process where a stamper is made. Because a stamper becomes an integral part of a molding process, it needs to be very robust to withstand the stresses involved in the molding process as well as to ensure that the replicated discs can be read with high speeds, accuracy and stability.

According to one aspect of the present invention, the molding machine is so configured that substrates are molded a lot faster than that in a prior art system so that the entire cycle time for a disc is significantly reduced. However, when a molding process is speeded up, there are potentially a number of problems that may cause the discs to fail various disc requirements including the stringent tilt requirement. As a result, the discs may not be as good as otherwise the discs were given sufficient time to be molded. When the molding process is speeded up, which means the stamping time is shortened, one of the problems as the result of the shortened time is the distortion of the pit geometry in the molded substrate (i.e., a replicated disk or replica).

Without increasing the time in the molding process but to compensate the distortion of the pit geometry on a substrate as a result of faster stamping, the stamper used in the molding process is configured not exactly as what a stamper is commonly or formed in a prior art system. Traditionally, to create replicas, it is required that a stamper has an exact inverse image of what should be on a replica. FIG. 2A shows that a stamper 202 is an exact inverse image of a replicated substrate 204, which means that the stamper 202 is made the opposite of what is expected in the replicated substrate 204. However, when a stamper stamps substrates at a substantially high speed, the pit geometry on a stamped substrate can be distorted because of the shortened time and the characteristics of the material (e.g., polycarbonate) used for the substrate.

In one embodiment, the stamper is pre-distorted in such a way that when the "distorted" pit geometry on the stamped substrate is distorted, the resultant pit geometry is actually reversely corrected and becomes nearly perfect. FIG. 2B shows that the stamper 210 is pre-distorted. In particular, the teeth 212 in the stamper 210 used to imprint the pits are made relatively longer and thinner than an "exact" stamper 202 of FIG. 2A. After a substrate is stamped by the stamper 210, the imprinted pit geometry is the image of the pre-distorted stamper 210 and then goes through the inherent distortion in the material of the stamped substrate. Because the stamper 210 is so pre-distorted to account for the distortion after the stamping, as a result, the stamped substrate becomes nearly perfect (in compliance of the disc requirements).

On the other hand, once a stamper (e.g., an electroformed stamper) is loaded into a molding machine, hot molten material (e.g., polycarbonate) is injected into the mold cavity which is comprised of the stamper with all the information on one side and a block on the other side. The molten material is injected under several tons of pressure to cause the resin to conform to the pit geometry of the stamper so as to create a perfect replica, in reverse image, of the stamper. There are many known challenges to molding a type of material, such as polycarbonate, into flat, optically and geometrically faithful replicas of the stamper. These challenges can be magnified considerably with the small bit geometry in DVD specifications. In view of the geometry in CD, the DVD pit geometry is smaller and narrower and closer together than those of CD. This makes replicating disks more difficult because of the restricted flow of the material through the smaller mold structure.

Figure 2D:
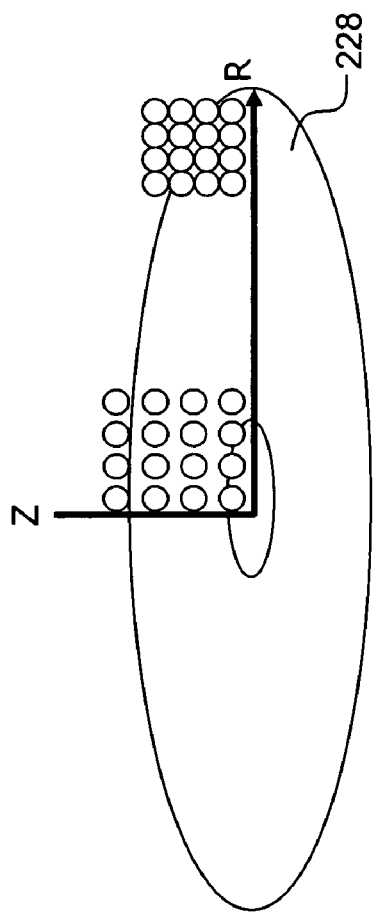
FIG. 2D shows the density in the material is less dense than that on the edge of a disk.

One of the problems commonly seen in stamped substrates from such a molding machine is warping caused by the density variations. In other words, the material density in the substrate is not uniform across the entire substrate, thus resulting in dynamic imbalance when a resultant disc is played at a high speed. Referring to FIG. 2C, there shows a cross-section view of a mold cavity 220 formed by two plates 222 and 224, wherein one of the two plates 222 and 224 is integrated with the stamper. The hot molten material is then injected into the mold cavity 220. In practice, it is difficulty to maintain keeping the density of the molten material perfectly even. If the density is not even, the molten material, when cooled down, may be bent towards a side of less density (e.g., the resulting disk 226). As shown in FIG. 2D, the density in the material is less dense than that on the edge of the disk 228. The density variation is one of the reasons that cause the non-flatness of the disk.

Figure 2E:
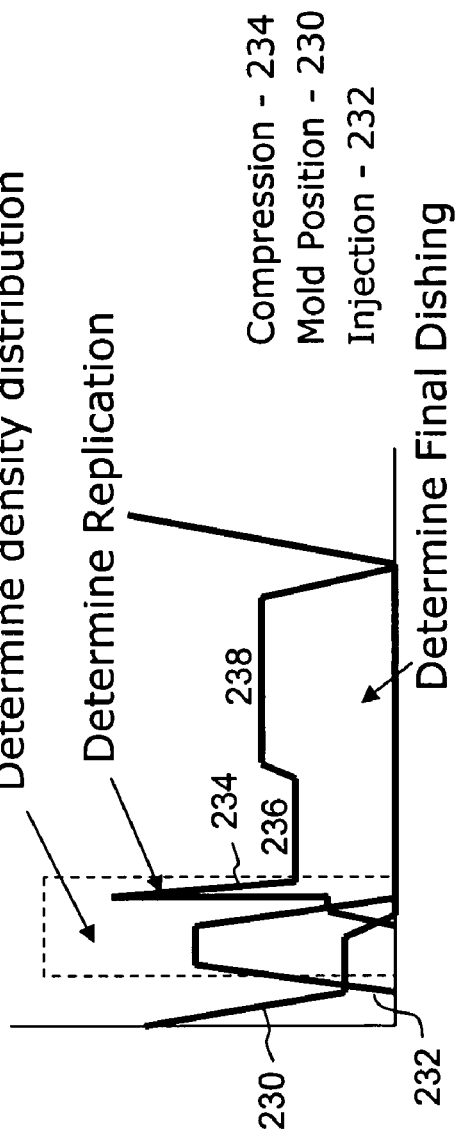
FIG. 2E shows respective profiles of the injection, mold position and compression in one embodiment.

According to one embodiment, the injection, mold position as well as compression are controlled with respect to each other. To facilitate the understanding of the technique, FIG. 2E shows respective profiles of the injection, mold position and compression. The profile 230 represents the mold position (e.g., one of the two plates 222 and 224), the profile 232 represents injection of the molten material and the profile 234 represents the control of the compression. In operation, according to one embodiment, as one of the plates 222 and 224 is pushed towards another one of the two plates 222 and 224 or the two plates 222 and 224 are pushed against each other, the molten material is injected into the mold cavity. The replication starts as soon as the injection is finished. As the profile 234 shows, the pressure is started about the time when the two plates are in position and increased to a maximum (e.g., 5 tons) when the injection is finished. The pressure is then started to be released to a certain level 236 for a predefined period. After that, the pressure is increased to another level 238 and kept for another predefined period before it is dropped to zero. Before the disk is released from the mold cavity, the pressure is increased again to the maximum so that the disk is hardened just enough while taking on all the characteristics of the mold.

Although a fast injunction and compression process may cause-variations in the molecular density that can cause radial and tangential tilts, the molecular density of a material can be effectively regulated by controlling the motion and pressure of the molding process. It is now possible to have a shorter cycle time by using a specially optimized stamper and/or the balance molding technique.

Figures 3A, 3B:
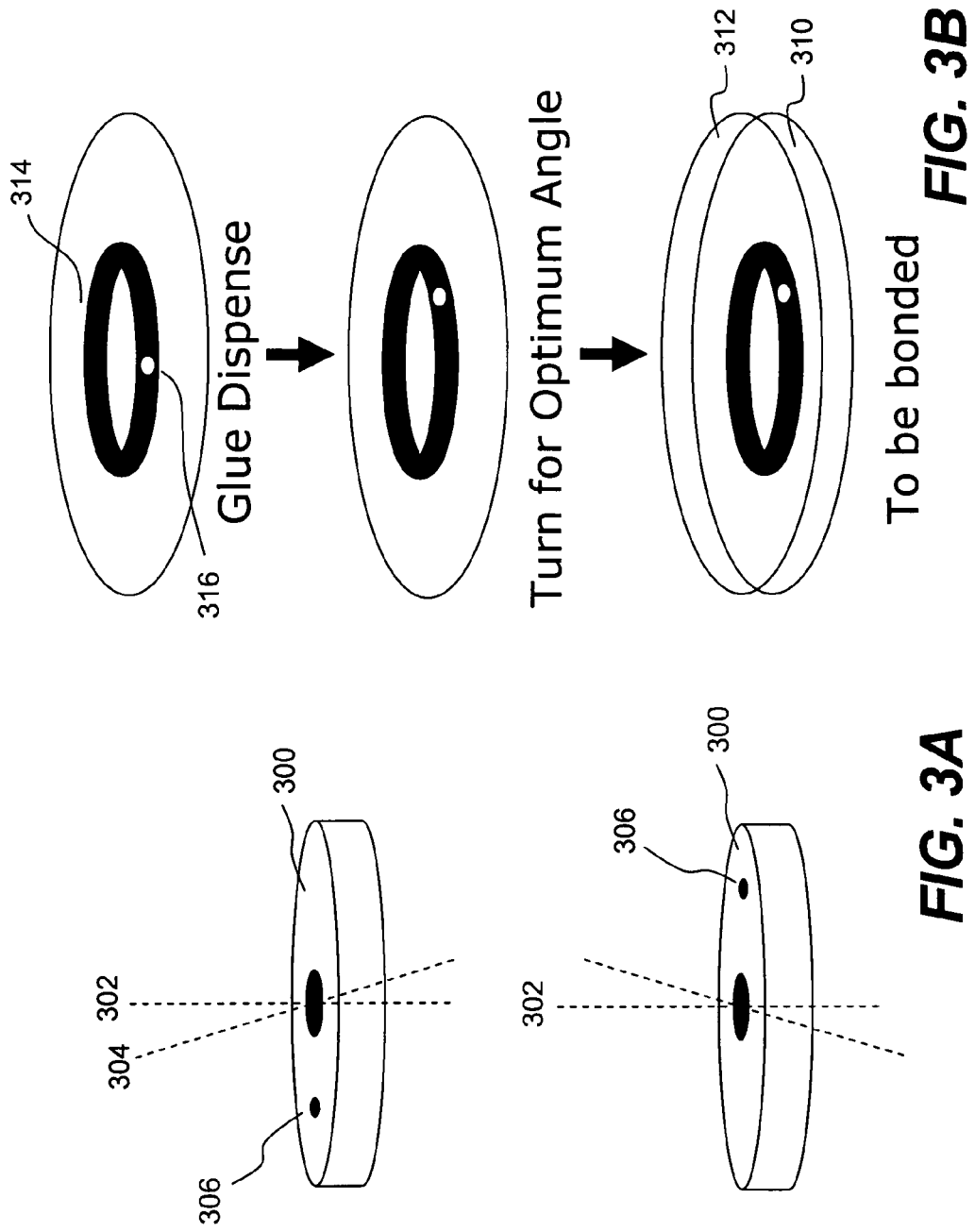
FIG. 3A shows a rotation of a disc with thickness variations.
FIG. 3B shows a process of minimizing the dynamic imbalance of a disc comprising two disks.

In any case, any dynamic imbalance must be minimized when a disc is read at a very high speed. The dynamic imbalance of a disc happens when the physical center of gravity of the substrate does not align with the geometrical center of the disc. FIG. 3A illustrates a rotation of a disc 300 with thickness variations. When the disc 300 is caused to rotate beyond a certain speed, the physical center 306 of gravity varies around the geometrical center 302 of the disc 300. As shown in FIG. 3A, when the reference mark 304 is on the left side of the disc 300, the physical center 306 of gravity tilts towards left, when the reference mark 304 is on the right side of the disc 300, the physical center 306 of gravity tilts towards right.

When the speed to read the disc increases, the depth of focus of an optical pick-up (OPU) decreases due to a higher numerical aperture (NA). In other words, a higher numerical aperture means a shorter depth of focus, thus requiring a more stable focusing. An optical disc with high dynamic imbalance can appear moving up and down, causing vibration of the drive mechanism in a player, and hence a poor focus and tracking signal would be resulted therefrom. To account for the problem of the dynamic imbalance, the drive mechanism would have to speed down.

One of the important features in the present invention is to minimize the dynamic imbalance of a disc by using what is referred to as index bonding. As two substrates L0 and L1 from two molding machines are subsequently bonded together to form a disc, the two substrates are first rotated against each other by such a degree that the dynamic imbalance is minimized. In one embodiment, one or more sensors (e.g., optical sensors) are used to determine a corresponding profile of each of the two substrates. Given the profiles of the substrates, a rotation angle (i.e., a degree) of one of the two substrates with respect to a reference mark can be determined. In another embodiment, one of the two substrates marked with a reference is rotated against each other gradually, measurements of the dynamic imbalance with respect to each of the rotations are taken. The rotation angle is then determined from the minimum of the measurements. FIG. 3B shows a process of minimizing the dynamic imbalance of a disc comprising two disks 310 and 312. It is assumed that the disk 310 is marked with a reference point 316. Before the two disks 310 and 312 are bonded with a type of glue 314, the disk 310 is rotated by an angle (e.g., 25.24 degree). In operation, either one or both of the two disks 310 and 312 may be rotated with reference to the other by the angle.

Figure 3C:
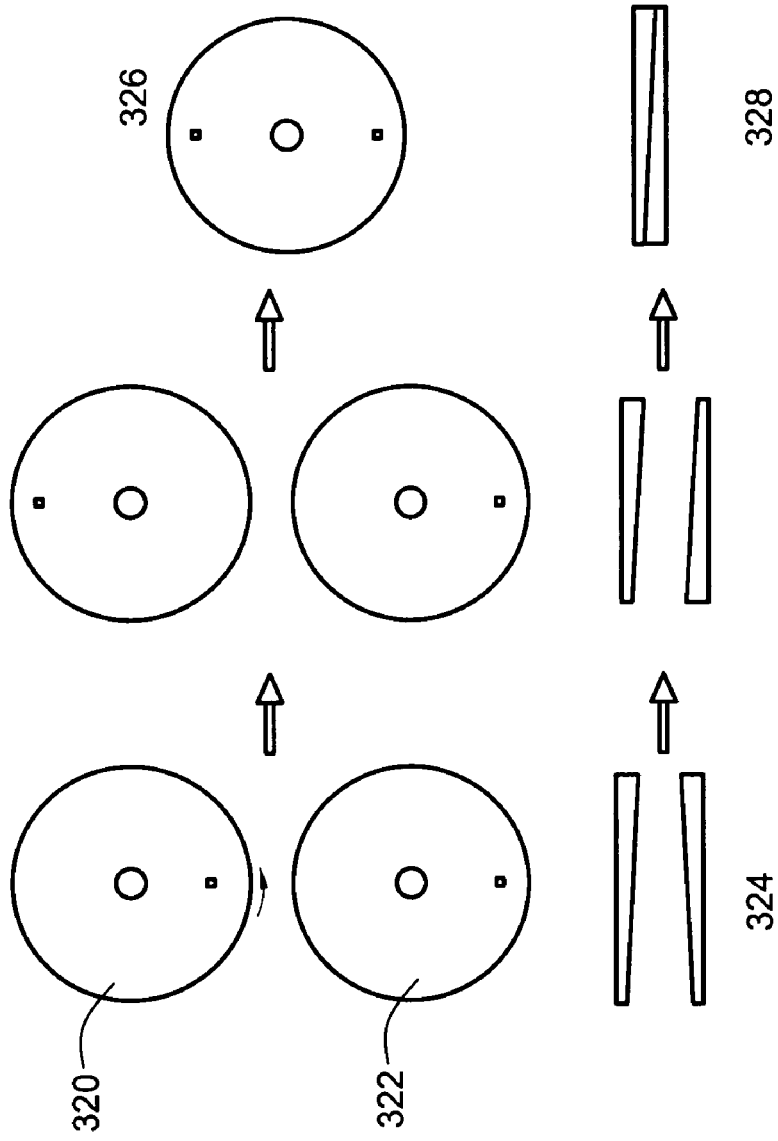
FIG. 3C shows an exemplary situation in which both disks demonstrate the non-flatness of the disks, and corresponding results.

FIG. 3C shows an exemplary situation in which both disks 320 and 322 demonstrate the non-flatness of the disks. If the disks 320 and 322 were to be bonded as is, the dynamic imbalance in the result 324 could be magnified. In accordance with the index bonding as described above, it is assumed that a measurement has determined that a rotation of one of the disks by 180 degree gains a minimum dynamic imbalance. The disk 320 is chosen to rotate by 180 degrees and then bonded with the disk 322 to form a disc 326. As shown in the result 328, the non-flatness of the disks 320 and 322 has been effectively compensated. As a result, the dynamic imbalance of the disc 326, when played in a player, is minimized.

Figure 4:
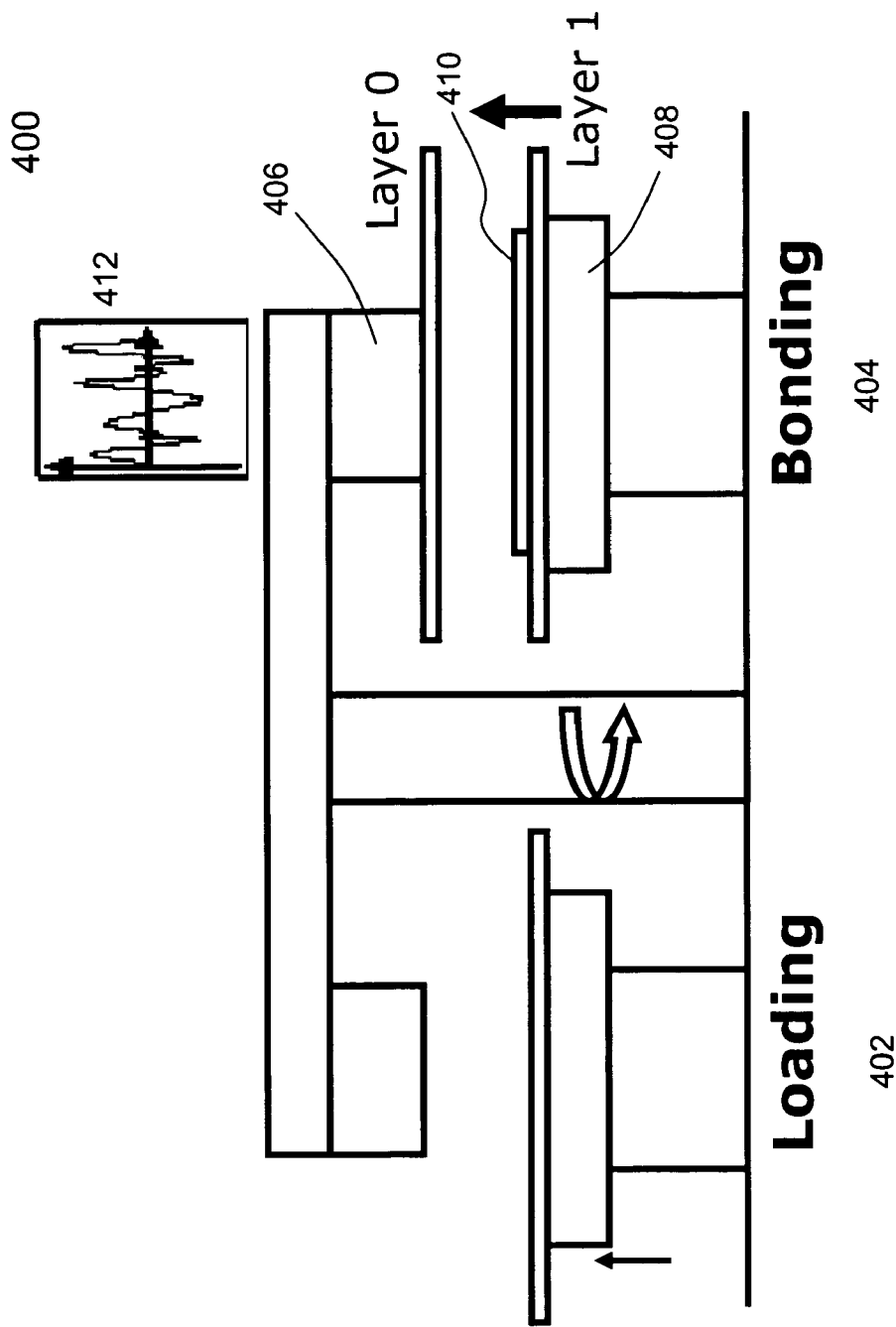
FIG. 4 shows a cross-section view of a configuration according to one embodiment of the present invention.

Referring now to FIG. 4, there shows a cross-section view of a configuration 400 according to one embodiment of the present invention. The configuration 400 may be used as one of the two bonding stations 110 of FIG. 1 and includes a loading part 402 and a bonding part 404. The loading part 402 is configured to load the substrates being transported from two molding stations and deliver, for example, an L0 substrate and an L1 substrate to the bonding part 404. As shown in FIG. 4A, the upper holder 406 is holding an L0 substrate and the lower holder 408 is holding an L1 substrate. The glue 410 is dispensed on the surface of the L1 substrate. In one embodiment, a glue nozzle is positioned above the surface of the L1 substrate and dispenses a type of glue when the lower holder 408, hence the L1 substrate, rotates. As a result, the glue is dispensed circularly. The L1 substrate is then pushed upwards the L0 substrate. When the glue 410 on the L1 substrate comes into contact with the L0 substrate, a power source is applied across the L0 and L1 substrates for a short period, causing to break the surface tension of the glue 410. The power source, depending on an exact implementation, may be from a power regulator that amplifies a regular power source (e.g., 110V/60 H or 220V/50 Hz) to a predefined high voltage.

According to one embodiment, the power source is from a generator that regulates not only the magnitude but also the duration of each pulse (i.e., frequency). Accordingly, a series of pulses, each may be of different duration and magnitude, are applied, either before or after the glue is dispensed, across the L0 and L1 substrates for a very short period of time. Still in another embodiment, the frequency and/or magnitude of the resulting electric field are simply random. At the same time the glue 410 is being pressed onto the surface of the L0 substrate, both disks are rotated at a speed adapted to the characteristic of the glue such that the glue 410 is evenly spreading outwards due to the centrifugal force. In one embodiment, after the glue is dispensed on the L1 substrate, a predefined time period (e.g., 2 minutes) is let to lapse before the L0 and L1 substrates are pressed. During the predefined time period, the dispensed glue is allowed to naturally spread, resulting in more surface tension to be broken.

According to one embodiment, the rotating speed of both disks pertaining to the glue spreading speed is regulated by a servo control via an electric voltage applied thereon. The voltage is controlled and programmable via a set of parameters. Exemplary parameters include a magnitude of the voltage and a time the voltage is applied to. As a result, the bonding of disks using dynamic alternating electric field can effectively suppress secondary bubbles generated by an overcharge of the substrates in a traditional bonding system.

Figure 5A:
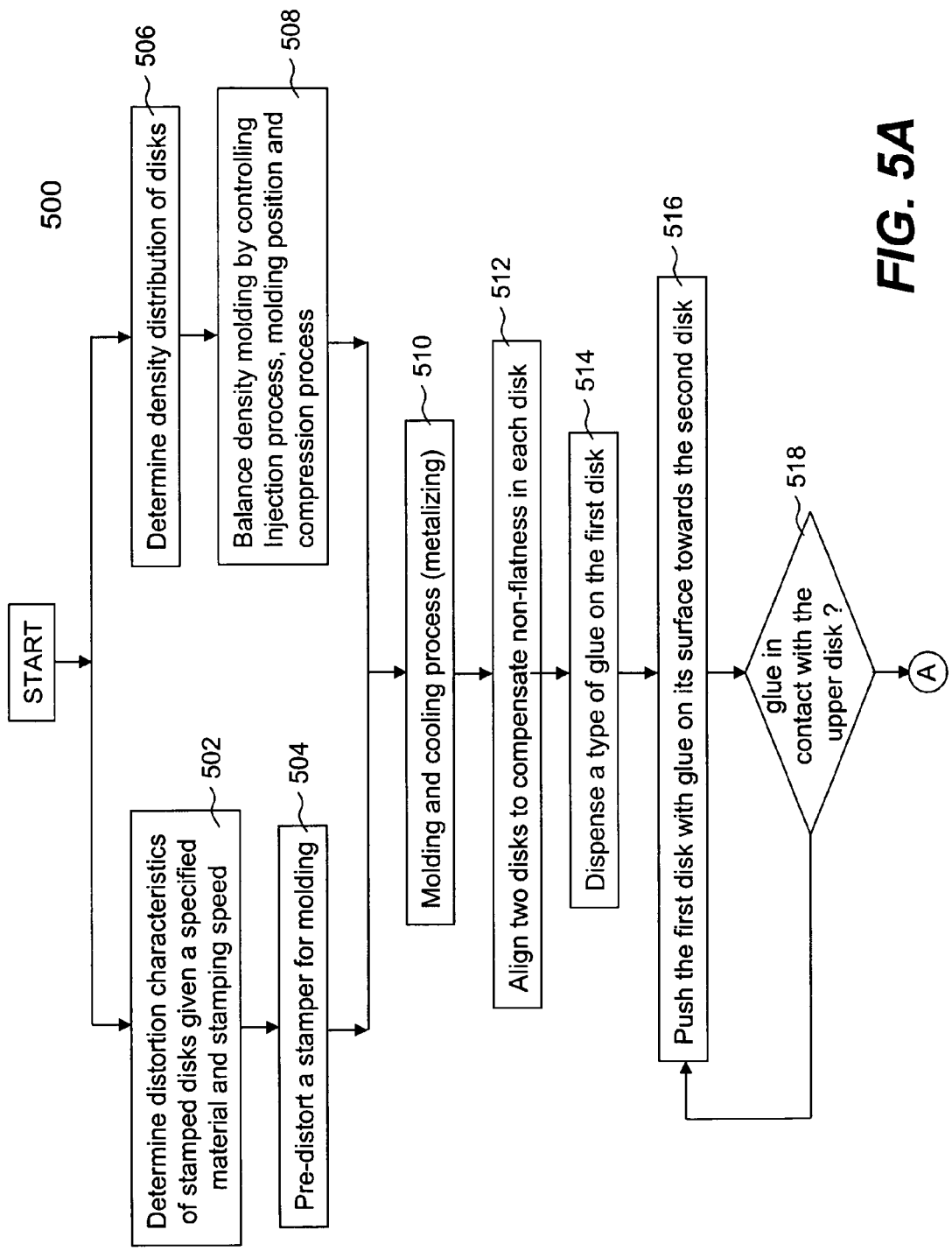
FIG. 5A and FIG. 5B show collectively a flowchart or process of producing disk-like optical medium for reading at high speed and with great stability and accuracy.
Figure 5B:
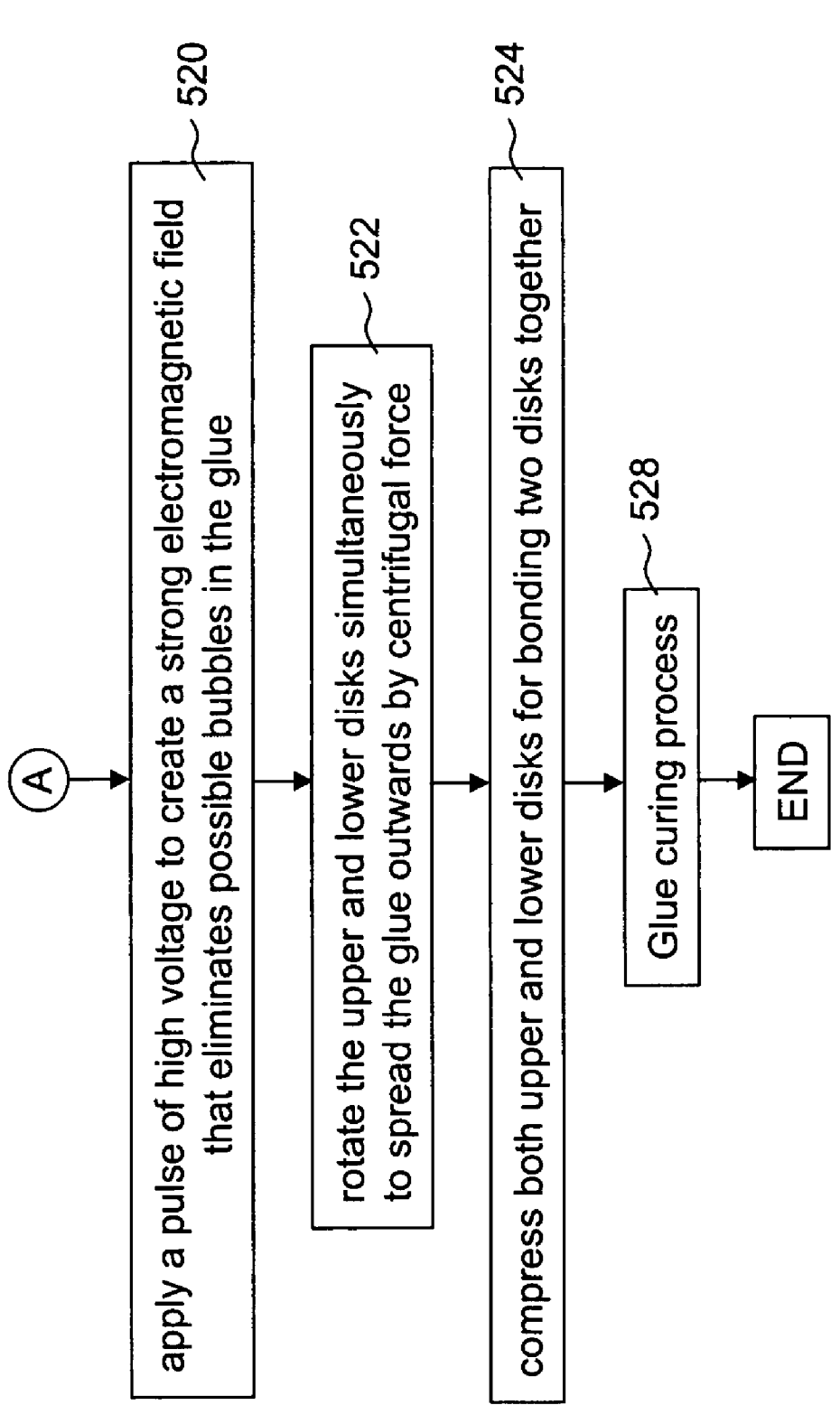

FIG. 5A and FIG. 5B show collectively a flowchart or process 500 of producing disk-like optical medium for reading at high speed and with great stability and accuracy. The process 500 may be implemented with software and hardware as a method, a process, and/or a system. The process 500 is presented in a way that combines one or more aspects of the present invention. Given the description herein, it can be appreciated by those skilled in the art that not all functions in the process 500 must be employed in order to practice the present invention.

At 502, the distortion characteristics of stamped disks are determined. Given the type of material used to produce the disks, the time allocated for the molding processing and other constraints, measurements are carried out to determine how the disks are distorted with reference to the stamper. These measurements are used at 504 to pre-distort a stamper in such a way that the pit geometry in the stamped disks is substantially in conformity with the requirement after the distortion. The process 500 may go to 510 where the molding with the stamper takes place.

At 506, a density distribution of disks is determined. Based on the density distribution, the injection process, molding position and compressions process are respectively controlled at 508 to balance the density of the material to minimize possible warping of the disks as well as dynamic imbalance. It should be noted that the functions at 506 and 508 may be used independently from or in combination with the functions 502 and 504.

In any case, disks are produced and then cooled at 510. Depending on applications, disks may or may not be metalized at 510. The process 500 then goes to 512 where two disks are rotated with respect to each other by a degree, if there are any, to compensate for non-flatness of the disks so as to minimize the dynamic imbalance of a disc formed by bonding the two disks. At 514, a certain amount of glue is dispensed onto a first disk. Two disks are needed to move relatively towards each other. In one embodiment, the first disk with the glue on its surface is pushed to a second disk at 516. A determination is made at 518 whether the glue on the first disk is in contact with the second disk. If the contact has not been reached, the process 500 goes back to 516 where the first disk is continued to be pushed towards the second disk. When the glue contacts the second disk, a power source is applied to create an alternating strong electromagnetic field that eliminates possible bubbles in the glue at 520.

At 522, both disks are now rotates at a high speed. Due to the centrifugal force from the rotation, the glue between the two disks are evenly spread outwards and any extra amount of the glue, if there are any, may be removed. At 514, both disks are compressed and bonded. A curing process of the glue takes place at 524.

There are numerous functions, benefits and advantages in the present invention, one of them is that the present invention provides techniques for producing optical discs with minimum dynamic imbalance that can be read at high speeds with great stability and accuracy. Another one of the functions, benefits and advantages in the present invention is the specialized stamper that allows for faster stamping without inducing distortions in the stamped disks. Still another one of the functions, benefits and advantages in the present invention is the balance density molding that balances the distribution density of one or more materials used for the disks. Still another one of the functions, benefits and advantages in the present invention is the index bonding that provides effective compensation of non-flatness in the disks and minimizes dynamic imbalance. Yet another one of the functions, benefits and advantages in the present invention is the bonding based on an alternating electric field effectively eliminates bubbles in the glue so as to provide bubble-free bonding of disks. Other functions, benefits and advantages may be appreciated by those skilled in the art given the detailed description herein.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for bonding substrates to form an optical disc, the method comprising:
   dispensing a certain amount of glue on a first substrate;
   moving the first substrate and a second substrate relatively towards each other;
   applying a random signal from a power source across the first and second substrates to create an electric field with random frequency and/or magnitude to eliminate possible bubbles in the glue for a predefined time, before the first substrate and the second substrate are pushed towards each other for bonding; and
   rotating the first and second substrates together at a substantially high speed to spread evenly the glue therebetween by a centrifugal force while compressing the first and second substrates for bonding.

2. The method as recited in claim 1, wherein the electric field with random frequency and/or magnitude breaks down surface tension of the glue.

3. The method as recited in claim 2, further comprising:
   allowing the dispensed glue to spread naturally for a predefined time period before the first substrates and the second substrate are being compressed.

4. The method as recited in claim 3, wherein the electric field with random frequency and/or magnitude breaks down more surface tension of the glue being spread around than a regular electric field does.

5. The method as recited in claim 1, further comprising:
   rotating one of the first and second substrates by an angle to minimize possible dynamic imbalance of a disc including the first and second substrates.

6. The method as recited in claim 5, wherein the angle is measured from a plurality of pairs of substrates produced respectively from at least two molding stations.

7. The method as recited in claim 6, wherein the angle is so determined that, when the first and second substrates are bonded, possible non-flatness on each of the first and second substrates is compensated.

8. The method as recited in claim 1, wherein the dispensing of the certain amount of glue on the first substrate comprises:
   placing the first substrate with its surface facing up; and
   dispensing the glue from a fixed glue nozzle on the surface of the first substrate while the first substrate is rotated.

9. The method as recited in claim 8, wherein the moving of the first substrates and the second substrate relatively towards each other comprises:
   placing the second substrate with its surface facing towards the surface of the first substrate; and pushing the first substrate towards the second substrate.

10. The method as recited in claim 9, wherein the power source is programmable so that the electric field with random frequency and/or magnitude changes in magnitude and frequency.

11. The method as recited in claim 10, wherein the power source is provided from a regulator controlled in accordance with the substrates and/or characteristics of the glue.

12. A method for bonding substrates to form an optical disc, the method comprising:
   adjusting a first substrate by an angle with respect to a second substrate to minimize possible dynamic imbalance of a disc including the first and second substrates;
   dispensing a certain amount of glue on the first substrate;
   allowing the dispensed glue to spread on the first substrate for a predefined time period;
   before pushing the first disk towards the second substrate, applying a random signal from a power source across the first and second substrates to create an electric field with random frequency and/or magnitude to eliminate possible bubbles in the glue; and
   rotating the first and second substrates together at a substantially high speed to spread evenly the glue between the first and second substrates by a centrifugal force while the first and second disks are being bonded.

13. The method as recited in claim 12, wherein the angle is measured from a plurality of pairs of substrates produced respectively from at least two molding stations.

14. The method as recited in claim 12, wherein the angle is so determined that, when the first and second substrates are bonded, possible non-flatness on each of the first and second substrates is compensated.

15. A method for bonding substrates to form an optical disc, the method comprising:
   dispensing a certain amount of glue on a first substrate near an inner opening of the first substrate from a glue nozzle positioned above the substrate while keeping the first substrate rotated so that a circular glue ring is formed thereon;
   holding the first substrate by a lower holder;
   holding a second substrate by an upper holder, wherein before the lower holder is driven to push the first substrate towards the second substrate,
   applying a random signal from a power source across the first and second substrates to create an electric field with random frequency and/or magnitude to eliminate possible bubbles in the glue, and
   wherein the first and second substrates rotate simultaneously at a substantially high speed to spread evenly the glue ring by a centrifugal force to bond the first and second substrates.

16. The method as recited in claim 15, wherein
   the lower holder is driven to rotate the first substrate by an angle to minimize possible dynamic imbalance of a disc including the first and second substrates; or
   the upper holder is driven to rotate the second substrate by an angle to minimize possible dynamic imbalance of a disc including the first and second substrates.

17. The method as recited in claim 16, wherein the angle is measured from a plurality of pairs of substrates produced respectively from at least two molding stations.

18. The method as recited in claim 16, wherein the angle is so determined that when the first and second substrates are bonded, possible non-flatness on each of the first and second substrates is compensated.

19. The method as recited in claim 15, wherein the means for dispensing the certain amount of glue on the first substrate comprises:
a fixed glue nozzle dispensing the glue on a surface of the first substrates placed facing up while the first substrate is rotated on the lower holder.

20. The method as recited in claim 15, wherein the power source is programmable so that the electric field with random frequency and/or magnitude alternates in magnitude and frequency.

21. The method as recited in claim 20, wherein the power source is provided from a regulator controlled in accordance with the substrates and/or characteristics of the glue.

22. The method as recited in claim 15, further including curing the glue by a glue curing means.

23. The method as recited in claim 15, further comprising:
providing a disc test stage configured to check quality of discs sequentially from a bonding station after the discs are sequentially cured through the curing means; and
providing two disc buffers, one configured to receive the discs qualified as good ones by the disc test stage, the other configured to receive the discs disqualified as fault ones by the disc test stage.

* * * * *